United States Patent [19]

Chaw et al.

[11] Patent Number: 5,224,720

[45] Date of Patent: Jul. 6, 1993

[54] STROLLER FOR A BABY

[76] Inventors: Natural Chaw, No. 1146, Chung-San Rd., Jih-Nan Li, Tai-Chia Chen Taichung Hsien, Taiwan; Herng-Der Hwang, No. 742, Sec. 2, Chung-San Rd., Jih-Nan Li, Tai-Chai Chen, Taichung Hsien, Taiwan

[21] Appl. No.: 871,666

[22] Filed: Apr. 21, 1992

[51] Int. Cl.⁵ .............................................. B62D 61/06
[52] U.S. Cl. ........................................ 280/62; 280/30; 280/47.38; 280/650; 280/658
[58] Field of Search ............... 280/62, 47.38, 30, 47.4, 280/657, 658, 650

[56] References Cited

U.S. PATENT DOCUMENTS

| | | | |
|---|---|---|---|
| 4,685,688 | 8/1987 | Edwards | 280/30 |
| 4,836,573 | 6/1989 | Gebhard | 280/47.38 |
| 4,934,728 | 6/1990 | Chen | 280/47.4 |
| 4,953,880 | 9/1990 | Sudakoff et al. | 280/62 |
| 5,029,891 | 7/1991 | Jacobs | 280/62 |
| 5,076,599 | 12/1991 | Lockett et al. | 280/657 |

FOREIGN PATENT DOCUMENTS 2652238  5/1978  Fed. Rep. of Germany ... 280/47.38

Primary Examiner—Eric D. Culbreth
Attorney, Agent, or Firm—Leydig, Voit & Mayer

[57] ABSTRACT

A multi-purposed stroller includes a chair having a cover for shielding the same from sunshine and rain. The chair has a first and second recess respectively extending from a bottom and a front of the chair. A frame fixedly attached to the chair adjacent to its bottom has two ends carrying detachably a pair of rear wheels. The chair also has a pair of first toothed wheels respectively fixed on both sides of the chair adjacent to its top portion and a foot rest extending from the front and having a third recess therethrough and in communication with the second recess. A forked frame that includes two arms carrying a second wheel therebetween is inserted detachably into the second and third recesses. An inverted U-shaped frame is disposed on both sides of the chair that includes two arms, each with a second toothed wheel adapted to be meshed with the first toothed wheel such that the position of the inverted U-shaped frame can be altered relative to the back portion of the chair.

3 Claims, 5 Drawing Sheets

STROLLER FOR A BABY

BACKGROUND OF THE INVENTION

1. Field of Invention

This invention relates to a stroller for a baby, more particularly to a stroller which can be converted into many shapes, thereby accommodating the baby for baby-sitting purposes.

2. Description of the Related Art

Baby strollers are well known in the art. However, each one of said strollers has their respective usage and advantage but can not provide several services by itself, such as serving as a cradle, a rocking chair and the like. Said strollers can not be individually detached and reassembled into some other form to accommodate a baby therein so as to serve as a baby-sitting toy. Therefore, a stroller which can be converted into various forms, each of which is to serve as a baby-sitting toy, is much needed from an economic point of view.

SUMMARY OF THE INVENTION

Therefore, the main object of the present invention is to provide a stroller which can be converted into various forms, and each of the converted forms being able to serve as a baby-sitting toy.

The stroller according to the present invention includes a chair having a back portion, a seat portion and a safety belt for securing a person seated on the seat portion. The seat portion has a frame fixed to a bottom of the same, which frame includes two ends respectively carrying a pair of wheels. The back portion has a pair of first toothed wheels formed on both sides thereof. An inverted U-shaped frame includes two arms, the free ends of which have a second toothed wheel adapted to be meshed with the first toothed wheel, and is attached to the back portion such that a clamping screw passing through the two toothed wheels connect them together in a fixed position relative to the back portion. The seat portion further includes a first recess of a first predetermined depth extending from the bottom, and a second recess of a second predetermined depth extending from a front end of the seat portion and a foot rest projecting from the front end of the seat portion. The foot rest has a third recess formed therethrough and in communication with the second recess. A forked frame, which includes two arms carrying a wheel therebetween and a shaft extending from the two arms, is received detachably in the second and third recesses.

BRIEF DESCRIPTION OF THE DRAWINGS

Other features and advantages of the present invention will become apparent in the following detailed description, including drawings, all of which show a non-limiting form of the present invention, and of which.

DETAILED DESCRIPTION OF THE PREFERRED EMBODIMENT

Figure 1:
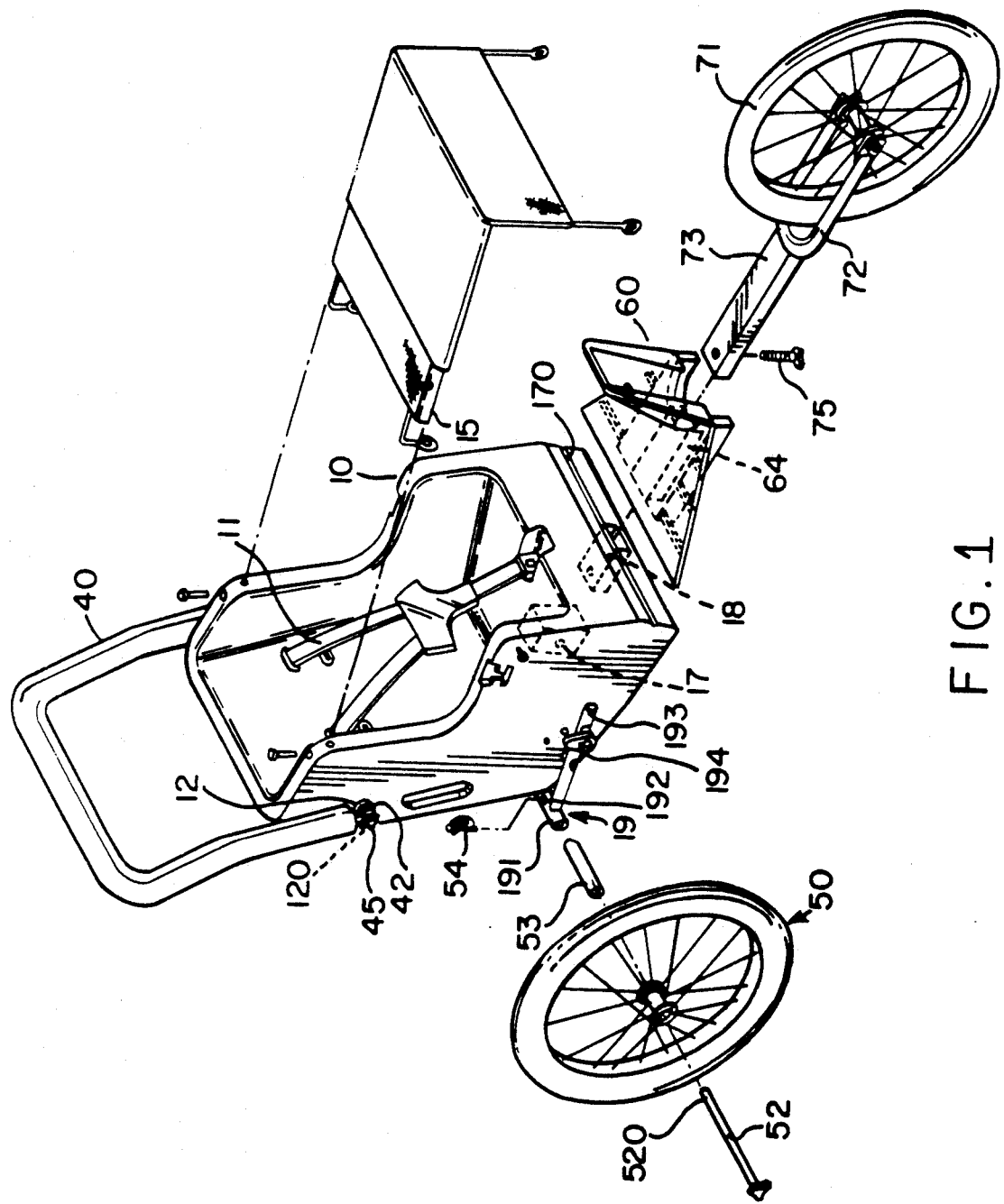
FIG. 1 shows an exploded view of a stroller of the present invention.

Referring to FIG. 1, a stroller according to the present invention is shown to comprise a chair (10), a handle (40), a pair of rear wheels (50) and a frame (73) carrying a front wheel (71).

The chair (10) is made of a plastic material and is produced by a one piece mold. A safety belt (11) is provided on the chair (10) for securing a person who is seated in the chair. A pair of first toothed wheels (12), each with a threaded bore (120), is fixed on both sides of the chair (10) adjacent to its top section thereof.

The handle (40) is an inverted U-shaped frame, generally made of a metal tube, which includes two arms, each free end of which have a second toothed wheel (42) adapted to be meshed with the first toothed wheel (12), and which is disposed on both sides of the chair (10). A clamping screw (45) passes through the second and first toothed wheels (12,42) to connect the two together in a fixed position relative to the back portion of the chair (10). In case the position of the handle (40) relative to the back of the chair needs to be altered, the clamping screw (45) is loosened and the position of the handle (40) is changed into a desired position relative to the back of the chair before the first and second toothed wheels are meshed and joined together again in the same manner as above described.

A U-shaped frame (19) includes two arms (193) screw-fastened to both sides of the chair (10) adjacent to its bottom by a clamping screw (194), such that it can be easily disassembled when desired. The shaft (191) interconnecting the two arms (193) has two radial holes (192) adjacent to the free ends, respectively. A connecting pin (52) with a radial hole (520) is inserted through a sleeve member (53), which is inserted in the center of a hub of a rear wheel (50) in advance, and extended into the shaft (191). A resilient key (54) passes through two radial holes (192,520) of the shaft (191), and the connecting pin (52) holds the former and the latter together. It is important to note that the sleeve member (53), and the connecting pin (52) are employed in the preferred embodiment such that the rear wheel (50) can be easily detached when desire.

Figure 5:
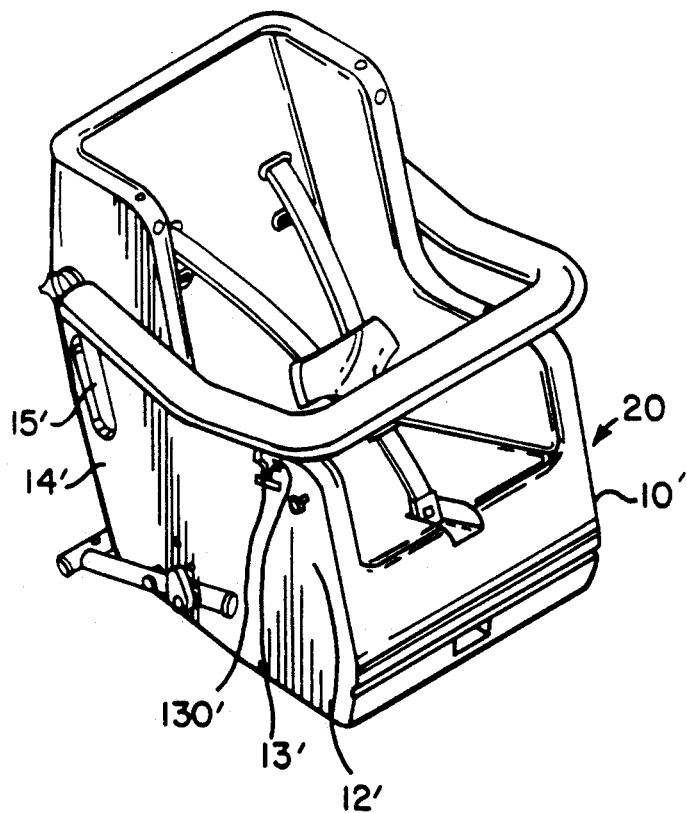
FIG. 5 shows a second preferred embodiment of a stroller of the present invention.
Figure 6:
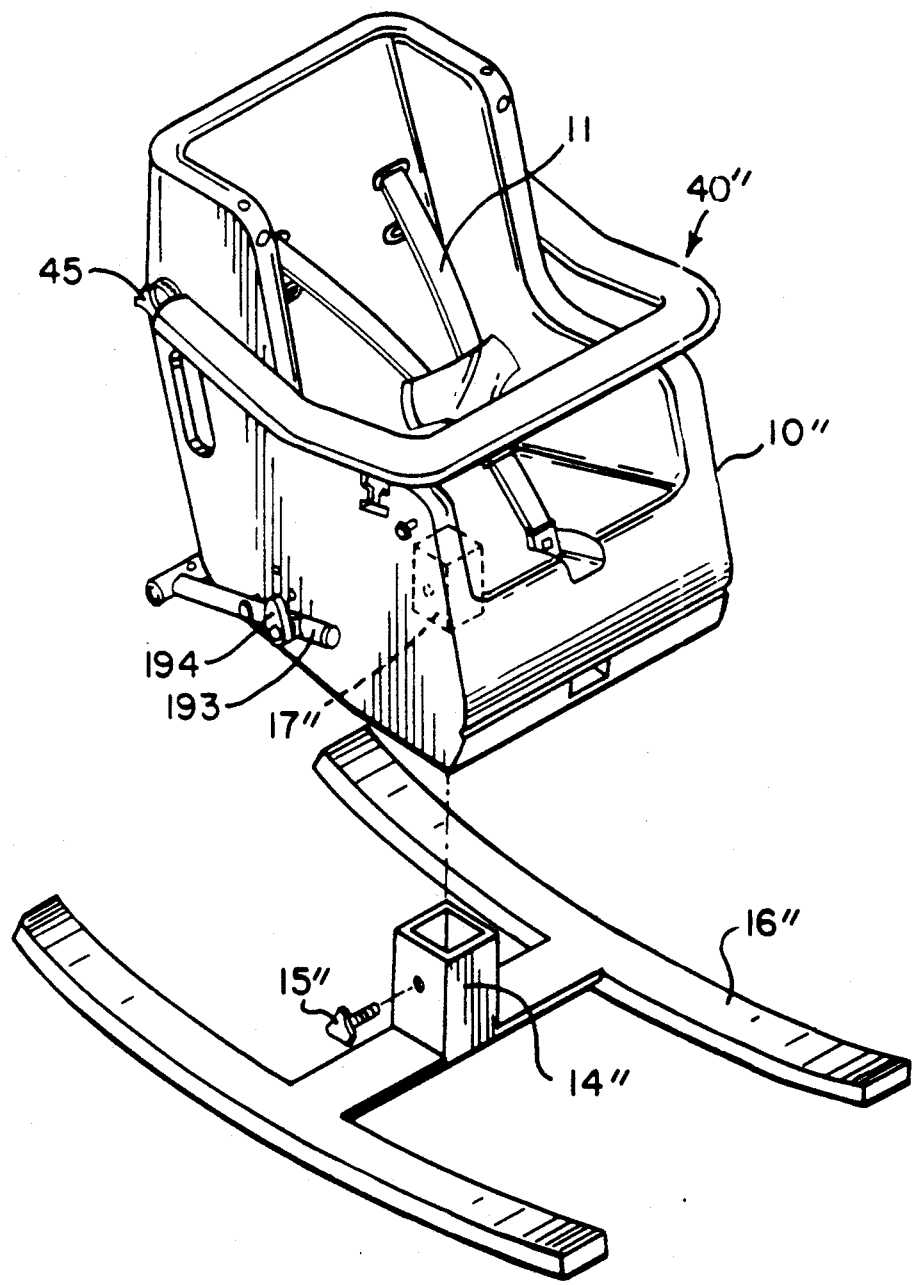
FIG. 6 shows a third preferred embodiment of a stroller of the present invention.

The chair (10) also includes a first recess (17) of predetermined depth extending into the seat portion from the bottom and a second recess (18) of predetermined depth extending into the seat portion from the front of the chair. When the rear wheels (50) are removed from the U-shaped frame (19), the chair (10) itself forms a safety chair (10'), as illustrated in FIG. 5, for accommodating a baby therein to baby-sit the occupant. Alternatively, a top section (14") of a rocking frame (16") can be inserted into the first recess (17") of the chair (10") and be held together by a screw member (15"). Thus, the converted chair (10") serves as a rocker in which the baby can be put to baby-sit him. Since the position of the handle (40") can be altered, as shown in FIG. 6, it forms an optional safety belt in addition to the safety belt (11). A baby provided in the chair is thus doubly safe from falling out of the rocker when the latter is rocked in order to please the baby or put the baby to sleep.

The chair (10) further includes a foot rest (60) extending detachably from the front end thereof and having a third recess (64) formed therethrough and in communication with the second recess (18).

Figure 2:
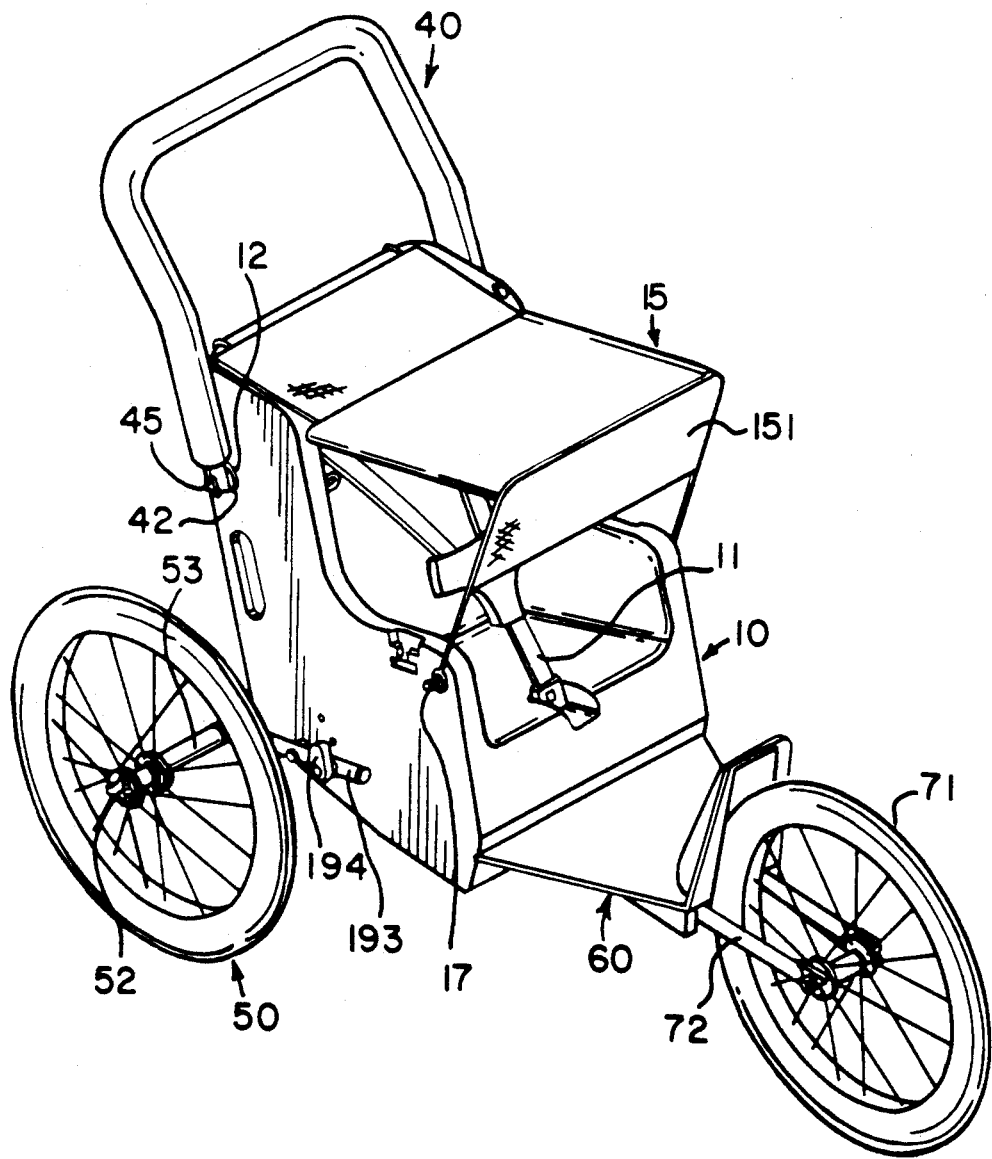
FIG. 2 shows an assembled view of the stroller of FIG. 1.
Figure 3:
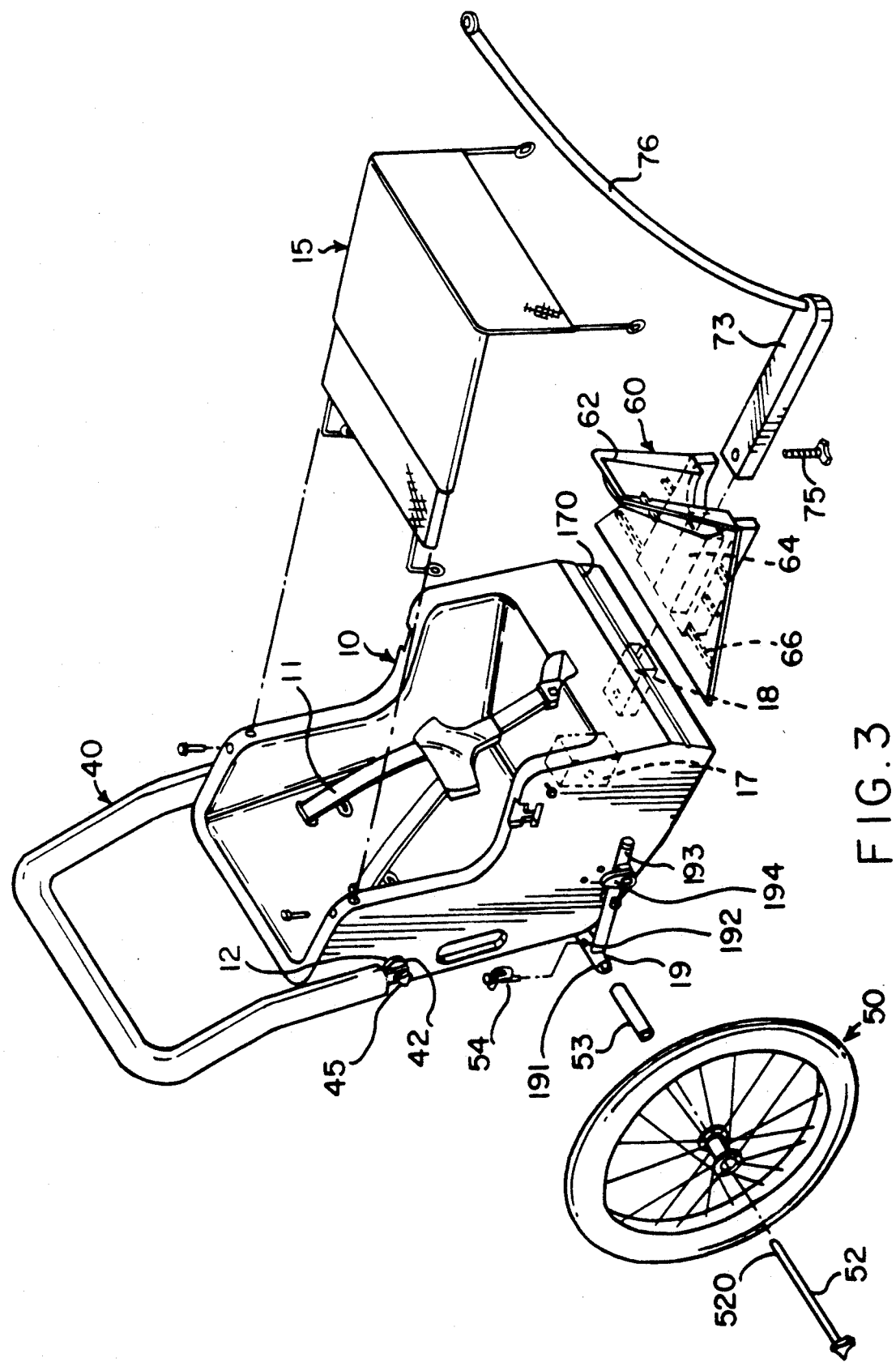
FIG. 3 shows a first preferred embodiment of a stroller according to the present invention.

The frame (73) has two arms (72) carrying a front wheel (71), is inserted into the third and second recesses (64,18) and is screw-fastened (75) to the seat portion of the chair (10). In order to protect the baby from sunshine and rain, a shielding device (15) can be disposed on the top section of the chair (10) by a known related art. FIG. 2 shows a perspective, schematic view of a stroller according to the present invention.

Figure 4:
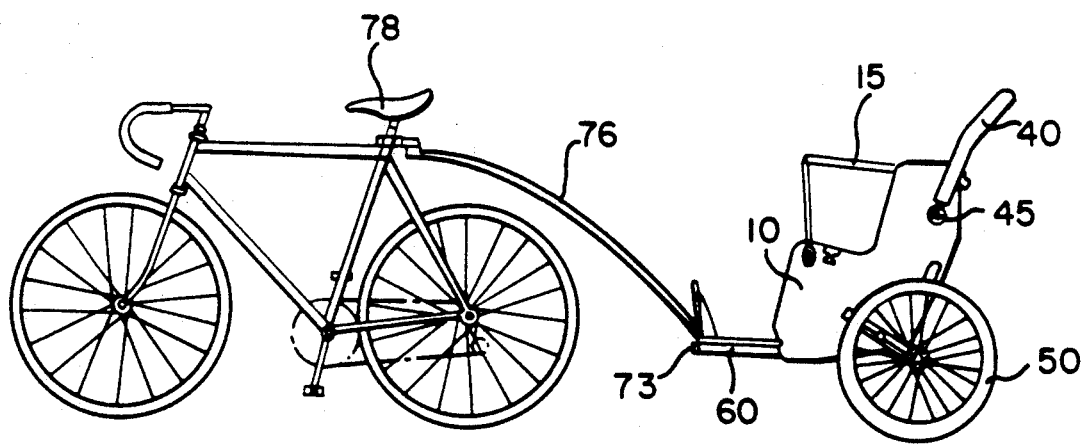
FIG. 4 shows the first preferred embodiment of a stroller of the present invention of FIG. 3 incorporated with a bicycle.

Since the front wheel (71) together with the frame (73) can be easily detached from the chair (10), the remaining assembly can be converted into a different form. A connecting rod (76) with one end inserted into the third and second recesses of the seat portion and the foot rest and a second end connected to a bicycle (78) is shown in FIG. 4. Thus the stroller of the present invention is pulled when the bicycle is peddled. Thus the baby can be taken out even if the parents are out biking.

In short, it is obvious from the above explanation that a buyer of the stroller of the present invention can convert the same into various forms, each of which can provide a particular service such that the user obtain the advantages as if buying several baby-sitting toys in addition to a mere stroller.

With the preferred embodiment thus illustrated and described, it will be apparent than many changes and modifications may be made in the general construction and arrangement of the present invention without departing from the spirit and scope thereof. Therefore, it is desired that the present invention be not limited to the exact disclosure but only to the extent of the appended claims.

I claim:

1. A stroller for a baby, comprising:
   a chair having a back portion, a seat portion with a first recess of predetermined depth extending from a front surface thereof, a recess of predetermined depth extending from a bottom surface of said seat portion and a safety means for securing a person seated on said seat portion;
   a frame fixed to said seat portion and having two ends for carrying detachably a pair of wheels respectively;
   said back portion having a pair of first toothed wheels respectively fixed on both sides thereof;
   an inverted U-shaped frame having two arms, a free end of each of said arms including a second toothed wheel meshed with said first toothed wheel;
   a clamping screw passing through said first and second toothed wheels to hold the former and the latter together in a fixed position relative to said back portion;
   said chair further including a foot rest extending detachably from said seat portion and having a third recess formed therethrough and being in communication with said first recess of said seat portion; and
   a forked frame having two arms carrying a wheel therebetween and a shaft extending from said two arms and being received detachably in said first and third recesses.

2. A stroller as claimed in claim 1, wherein said stroller further includes a means for shielding said chair from sunshine and rain.

3. A stroller as claimed in claim 1, wherein said stroller further includes a connecting rod, one end of which can be connected to a bicycle and another end of said connecting rod can be received in said first and third recesses when said forked frame is removed from said first and third recesses.

* * * * *